June 25, 1957  B. E. TREGANOWAN ET AL  2,796,889
FLUID FLOW CONTROL VALVES
Filed March 23, 1953  2 Sheets-Sheet 1
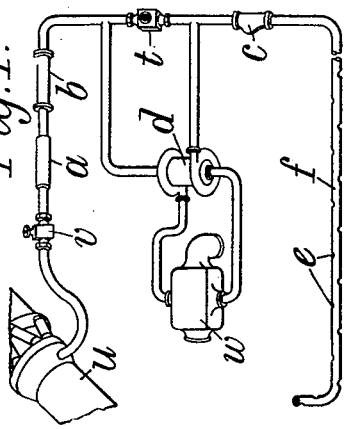
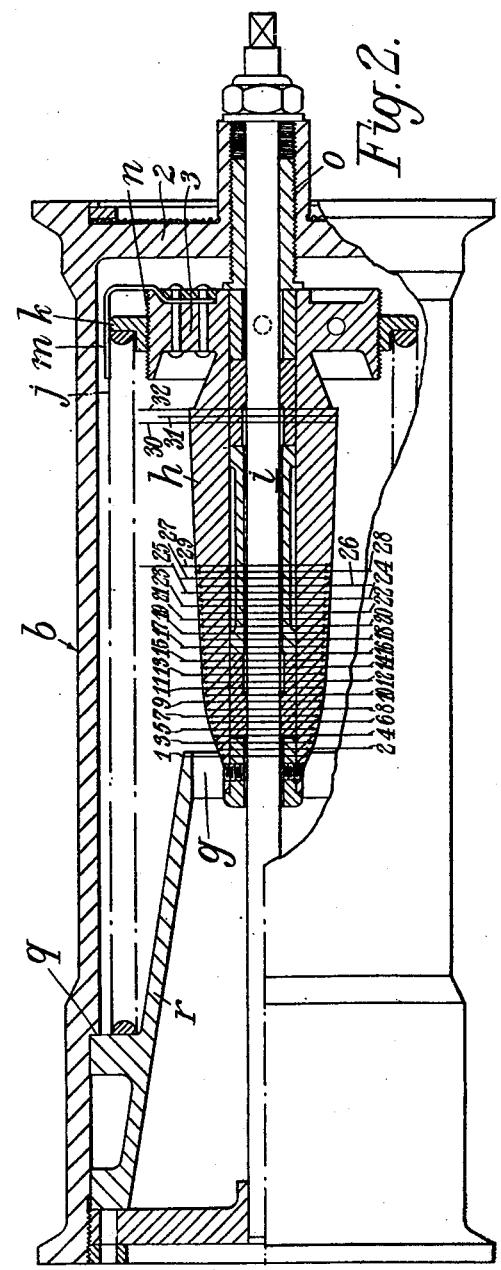
Inventors
B. E. Treganowan
R. J. Stephens June 25, 1957  B. E. TREGANOWAN ET AL  2,796,889
FLUID FLOW CONTROL VALVES
Filed March 23, 1953  2 Sheets-Sheet 2

Inventors
B. E. Treganowan
R. J. Stephens

United States Patent Office 2,796,889
Patented June 25, 1957

2,796,889
FLUID FLOW CONTROL VALVES

Bernard Eric Treganowan and Ronald John Stephens, Yeovil, England, assignors to Normalair Limited, Yeovil, England Application March 23, 1953, Serial No. 344,175

Claims priority, application Great Britain March 24, 1952

1 Claim. (Cl. 138—46)

This invention relates to fluid flow valves for controlling the flow of air to turbine-expander-cold-air units, e. g. for pressurised spaces such as aircraft cabins.

In certain aircraft cabin-pressurising systems air is required to be supplied from a pressure source, e. g. a high speed compressor either direct to the cabin or by way of a cold air unit, such unit embodying a turbine-driven centrifugal, axial or other type of compressor and a cooling section.

It is important in practice to ensure that the blade tip speed of the turbine shall not exceed a predetermined safe limit whilst it is also desirable that maximum refrigeration shall be obtainable when required.

The main object of the present invention is to provide an automatic flow control valve for such systems wherein the above requirement and desideratum may be at the same time achieved.

The invention consists in an automatic fluid flow control valve having features as set forth in the claim appended hereto.

Referring to the accompanying diagrammatic drawings:

Figure 1 illustrates a schematic lay-out of typical aircraft cabin pressurising equipment embodying the present invention.

Figure 2 is a sectional elevation of a convenient form of automatic air flow controller for use therein.

In carrying the invention into effect according to one form illustrated by way of example in Figure 1 as applied to a system for a pressurised cabin on a jet driven aircraft, air is passed from a compressor $u$ at about 87 lbs./in.² maximum at ground level by way of a cock $v$ of a filter $a$ to an automatic flow control valve $b$ whence it passes either direct to the cabin by way of a non-return valve $c$ and a by-pass valve $t$ or it passes by way of a cold air unit $d$ to cabin ducts $e$ in a pipe $f$ by way of the non-return valve $c$. An intercooler $w$ is associated with the cold air unit $d$.

Figure 3:
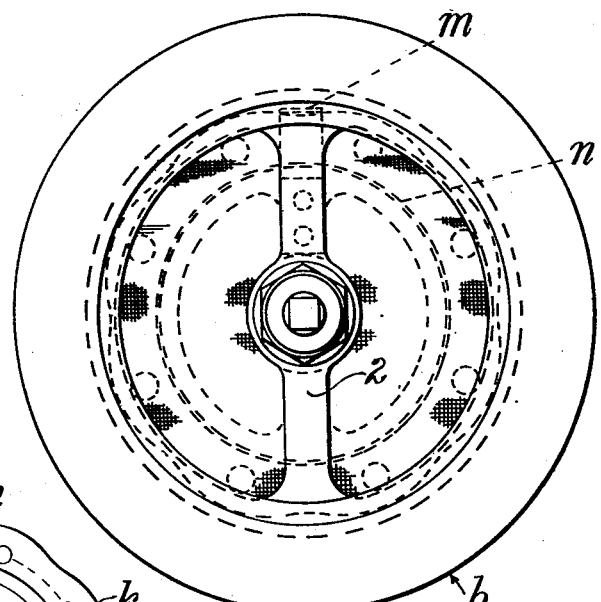
Figures 3 and 4 are end views thereof.
Figure 5:
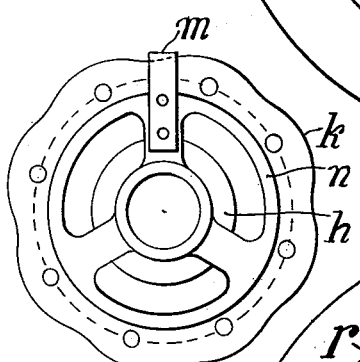
Figure 5 is an end elevational detail view of the plunger and the parts associated therewith.
Figure 4:
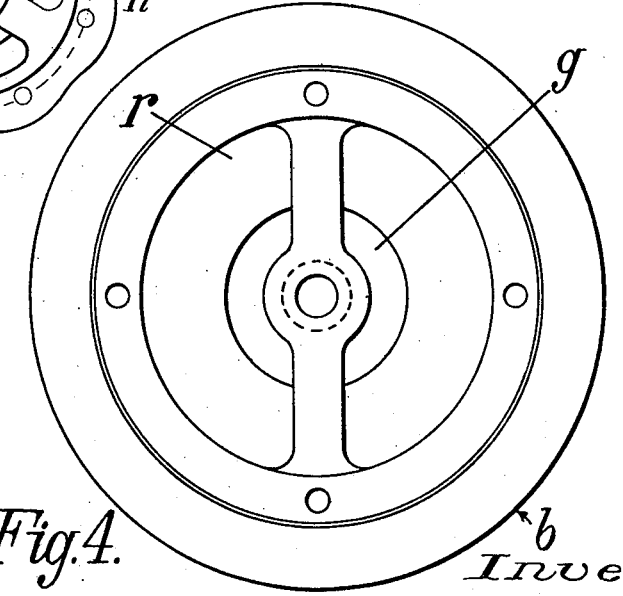

The automatic flow control valve $b$, a constructional form of which is shown in Figures 2 to 4, comprises a fixed circular orifice $g$ 1.12" in diameter through which a generally tapered plunger $h$ is adapted to penetrate.

The plunger $h$ is carried on a fixed guide $i$ and is urged by a constant-rate spring $j$ to that end of its permitted travel at which the smaller end of the plunger lies within the orifice (Figure 2). This end of the plunger has a diameter of .585" for about .14" and then is tapered at an angle of about 18° to the axis for about .16". From this point onwards up to a point of about 1.675" from the smaller end it has the following dimensions:

| St'n. | Dia., inches | St'n. | Dia., inches | St'n. | Dia., inches | St'n. | Dia., inches |
|---|---|---|---|---|---|---|---|
| 1  | 0.620  | 2  | 0.6570 | 3  | 0.6990 | 4  | 0.7356 |
| 5  | 0.7728 | 6  | 0.8060 | 7  | 0.8430 | 8  | 0.8700 |
| 9  | 0.8920 | 10 | 0.9050 | 11 | 0.9130 | 12 | 0.9210 |
| 13 | 0.9276 | 14 | 0.9330 | 15 | 0.9376 | 16 | 0.9400 |
| 17 | 0.9436 | 18 | 0.9460 | 19 | 0.9480 | 20 | 0.9490 |
| 21 | 0.9500 | 22 | 0.9510 | 23 | 0.9548 | 24 | 0.9602 |
| 25 | 0.9656 | 26 | 0.9703 | 27 | 0.9756 | 28 | 0.9802 |
| 29 | 0.9849 |    |        |    |        |    |        |

For the remaining 1.035" the taper is constant from .9849" to 1.0511". For the remaining .1", i. e. up to the larger end, the plunger has the following dimensions:

| St'n. | Dia., inches | St'n. | Dia., inches | St'n. | Dia., inches |
|---|---|---|---|---|---|
| 30 | 1.0511 | 31 | 1.0539 | 32 | 1.0558 |

Air is caused to enter through a spider 2 and then after passing through a further spider 3 carrying a ring $k$ passes between the orifice $g$ and the plunger $h$ in a direction towards the smaller end or nose of the latter, and a spring $j$ whose rate is 24 lbs. per inch deflection is employed, the spring being slightly pre-loaded so that the plunger does not move until a pressure difference of about 6 lbs./in.² is exceeded.

In operation, with such a valve in one particular instance when using full refrigeration, 20 lbs. of air per minute pass through the valve orifice, the pressure difference across the valve being about 32 lbs./in.² and the plunger will assume positions with the nose-half thereof in register with the orifice, such positions depending upon altitude and engine speed. When not using refrigeration, the plunger occupies positions extending over substantially its full range relatively to the orifice.

In order to effect slight adjustment of the slope of the initial part of the graph connecting air flow through and pressure drop across the valve, means are provided for adjusting the pre-loading of the spring and initial position of the plunger relative to the orifice.

The former means comprise the ring or collar $k$ engaging a spring $m$ and carried on a screw-threaded part $n$ integral with the plunger $h$ and forming part of the spider 3. The latter means comprise a screw-threaded sleeve $o$ carried in the spider 2 and constituting an abutment for the plunger $h$.

Alternatively, the orifice $g$ may be adjusted relative to the plunger $h$ either by means of shims at $q$ or by having the orifice body $r$ threaded and screwed into the casing $b$.

What is claimed is:

An automatic fluid flow control valve for a system embodying a turbine-expander-cold-air unit adapted to be operated by pressure difference across the valve comprising a circular orifice, an axial rod lying along the axis of the said orifice, a generally conical plunger axially supported by said rod and slidable thereon, said plunger normally positioned with its apex within so as to constrict said orifice and its body lying upstream with regard to the flow of fluid through said orifice, spring means to urge said plunger toward said normal position, said spring means being of such strength as to coact with the fluid passing through the restricted orifice, said plunger being adapted to be moved to vary said constriction by change in pressure difference across said constriction, whereby the flow of fluid is automatically controlled by movement of said plunger along said rod against the thrust of said spring the arrangement being such that at all positions of said plunger the force exerted thereon by the spring means balances the force exerted thereon in the opposite direction by the pressure difference across said orifice.

References Cited in the file of this patent

UNITED STATES PATENTS

| | | |
|---|---|---|
| 780,986 | Francis | Jan. 31, 1905 |
| 1,050,646 | Grove | Jan. 14, 1913 |
| 1,645,624 | Roucka | Oct. 18, 1927 |
| 1,944,088 | Linderoth | Jan. 16, 1934 |
| 2,179,144 | Buttner | Nov. 7, 1939 |
| 2,255,324 | McGill | Sept. 9, 1941 |
| 2,484,850 | Paget | Oct. 18, 1949 |
| 2,618,125 | Fischer | Nov. 18, 1952 |
| 2,647,531 | Berck | Aug. 4, 1953 |